United States Patent
Tanabe

(10) Patent No.: US 8,718,575 B2
(45) Date of Patent: May 6, 2014

(54) RADIO COMMUNICATION DEVICE, RADIO COMMUNICATION METHOD, AND PROGRAM

(75) Inventor: Kosuke Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 13/386,825

(22) PCT Filed: Jul. 28, 2010

(86) PCT No.: PCT/JP2010/062663
§ 371 (c)(1),
(2), (4) Date: Jan. 24, 2012

(87) PCT Pub. No.: WO2011/027635
PCT Pub. Date: Mar. 10, 2011

(65) Prior Publication Data
US 2012/0122404 A1    May 17, 2012

(30) Foreign Application Priority Data
Sep. 2, 2009   (JP) ................................. 2009-202512

(51) Int. Cl.
*H04B 7/02*   (2006.01)

(52) U.S. Cl.
USPC ........................................ 455/101; 455/63.4

(58) Field of Classification Search
USPC ................................................ 455/63.4, 101
See application file for complete search history.

(56) References Cited

U.S. PATENT DOCUMENTS

| | | | |
|---|---|---|---|
| 7,313,403 B2 | 12/2007 | Gong et al. | |
| 8,344,858 B2 | 1/2013 | Bloy | |
| 8,421,631 B2 | 4/2013 | Bloy et al. | |
| 8,659,430 B2 | 2/2014 | Bloy et al. | |
| 2005/0181737 A1 | 8/2005 | Kobayashi et al. | |
| 2006/0293087 A1 | 12/2006 | Tsutsui | |
| 2007/0087701 A1 | 4/2007 | Kobayashi et al. | |
| 2008/0259271 A1 | 10/2008 | De La Renaudiere | |

FOREIGN PATENT DOCUMENTS

| | | |
|---|---|---|
| CN | 1717949 | 1/2006 |
| CN | 1864344 | 11/2006 |
| CN | 101447820 | 6/2009 |
| EP | 1511189 | 3/2005 |
| JP | 2684888 | 12/1997 |

(Continued)

OTHER PUBLICATIONS

Taiwan Office Action dated Aug. 26, 2013, with partial English translation; Application No. 099126753.

(Continued)

*Primary Examiner* — Creighton Smith
(74) *Attorney, Agent, or Firm* — Young & Thompson

(57) ABSTRACT

A direction deciding unit calculates a plane the perpendicular of which is a directional vector from the wireless communication apparatus toward a radio station. A group deciding unit decides, as groups, antenna combinations each consisting of some ones but not all of a plurality of antennas. A distance calculating unit calculates the distances each between the coordinates of antennas projected, in parallel with the directional vector, onto the plane, and further calculates, for each group, as a group shortest-distance of the group, the shortest one of the calculation results of the distances each between the coordinates of the antennas constituting the group. An identifying unit identifies a group the group shortest-distance of which is the longest. A plurality of communication units communicate with the radio station by use of respective ones of a plurality of antennas in the group identified by the identifying unit.

20 Claims, 9 Drawing Sheets

(56) References Cited

FOREIGN PATENT DOCUMENTS

| | | |
|---|---|---|
| JP | 3108641 | 11/2000 |
| JP | 2004-304760 | 10/2004 |
| JP | 2004-312381 | 11/2004 |
| JP | 3866118 | 1/2007 |
| JP | 2007-258915 | 10/2007 |
| JP | 2008-092433 | 4/2008 |
| JP | 4129417 | 8/2008 |
| JP | 4202162 | 12/2008 |
| JP | 2009-033327 | 2/2009 |
| TW | 200713700 | 4/2007 |
| WO | WO 2007/057216 | 5/2007 |
| WO | WO 2009/034526 | 3/2009 |

OTHER PUBLICATIONS

International Search Report, PCT/JP2010062663, Aug. 31, 2010.
Chinese Office Action dated Feb. 8, 2014 in corresponding Chinese Patent Application No. 201080037661.1 with English translation of Chinese Office Action.

Spatial correlation characteristics of Rayleigh fading
(in the case in which a scattered wave spreads in normal
distribution shape about predetermined direction)
$\theta_0 = 90°$ Spatial correlation characteristics of Rayleigh fading
(in the case in which a scattered wave spreads in normal
distribution shape about predetermined direction)
$\theta_0 = 30°$ Group change information

| Group | Antenna | Terminal |
|---|---|---|
| Group G1 | Antennas 11-1, 11-2, 11-3 | Terminals TM1, TM2 |
| Group G2 | Antennas 11-2, 11-3, 11-4 | Terminal TM3 |
| Group G3 | Antennas 11-1, 11-2, 11-4 | Terminals TM4, TM5, TM6 |

Antenna identification information

| Predetermined direction | Group | Antenna |
|---|---|---|
| East | Group G1 | Antennas 11-1, 11-2, 11-3 |
| South | Group G6 | Antennas 11-4, 11-5, 11-6 |
| West | Group G2 | Antennas 11-2, 11-3, 11-4 |
| North | Group G5 | Antennas 11-3, 11-4, 11-5 |

RADIO COMMUNICATION DEVICE, RADIO COMMUNICATION METHOD, AND PROGRAM

TECHNICAL FIELD

The present invention relates to a radio communication device, a radio communication method, and a program.

BACKGROUND ART

In recent years, MIMO (Multi Input Multi Output) that is a radio communication method in which a transmission device separates data into a plurality of streams and simultaneously transmits them using a plurality of antennas and a reception device receives them using a plurality of antennas, separates received data into streams of data corresponding to transmission antennas and then restores the original data has attracted attention so as to transmit and receive data at high speed. In MIMO, radio communication devices that are provided with a plurality of antennas, for example three or more antennas, are used such that signals are transmitted and received using two or more antennas that are selected from the plurality of antennas with which the devices are provided.

In the foregoing radio communication devices, a correlation value between radio signals received by each of the plurality of antennas is small, the amount of data that can be transmitted and received by one antenna can be increased. Technologies that estimate the correlation value between radio signals received by each of the plurality of antennas and perform communication using antennas that allow the estimated correlation value to become small have been contemplated (for example, refer to Patent Document 1(Japanese Patent No. 4202162) and Patent Document 2 (Japanese Patent No. 3108641)).

DISCLOSURE OF THE INVENTION

However, since the technology disclosed in Patent Document 1 performs complicated computations using a weight vector, a re-modulation for demodulated signals of receive signals, and so forth to estimate the correlation value between radio signals received by each of the plurality of antennas, a problem arises in which the an amount of computation performed by the radio communication device becomes huge.

On the other hand, the technology disclosed in Patent Document 2 performs quadrature detection for received radio signals so as to estimate the correlation value between the radio signals. Thus, a problem arises in which that the processing load imposed on radio communication devices becomes large.

An object of the present invention is to provide a radio communication device, a radio communication method, and a program that can solve the foregoing problems.

SUMMARY OF THE INVENTION

To solve the foregoing problems, a radio communication device according to the present invention is a radio communication device having a plurality of antennas that is capable of transmitting and receiving radio signals to and from a radio station, including:

a direction decision section that decides a direction vector that represents a direction from the radio communication device to said radio station based on the radio signals that are received from said radio station by said plurality of antennas and that computes a plane on which the direction vector becomes a perpendicular line;

a group decision section that extracts combinations of antennas whose number is smaller than the number of said plurality of antennas and decides that the combinations should be groups;

a distance computation section that computes a distance between coordinates of antennas projected on said plane in parallel with said direction vector and decides that a shortest distance of the computed results of the distance between coordinates of antennas that make up each of said groups should be a group shortest distance;

an identification section that identifies a group in which said group shortest distance is the longest; and a plurality of communication sections that perform communication with said radio station using a plurality of antennas that make up the group identified by said identification section.

In addition, to solve the foregoing problems, a radio communication method according to the present invention is a radio communication method for a radio communication device having a plurality of antennas that is capable of transmitting and receiving radio signals to and from a radio station, including:

deciding a direction vector that represents a direction from the radio communication device to said radio station based on the radio signals that are received from said radio station by said plurality of antennas and computing a plane on which the direction vector becomes a perpendicular line;

extracting combinations of antennas whose number is smaller than the number of said plurality of antennas and deciding that the combinations should be groups;

computing a distance between coordinates of antennas projected on said plane in parallel with said direction vector and deciding that a shortest distance of the computed results of the distance between coordinates of antennas that make up each of said groups should be a group shortest distance;

identifying a group in which said group shortest distance is the longest; and performing communication with said radio station, by a plurality of communication sections with which the radio communication is provided, using a plurality of antennas that make up said identified group.

To solve the foregoing problems, a program according to the present invention is a program that causes a radio communication device having a plurality of antennas that is capable of transmitting and receiving radio signals to and from a radio station to execute procedures including:

a direction decision procedure that decides a direction vector that represents a direction from the radio communication device to said radio station based on the radio signals that are received from said radio station by said plurality of antennas and that computes a plane on which the direction vector becomes a perpendicular line;

a group decision procedure that extracts combinations of antennas whose number is smaller than the number of said plurality of antennas and decides that the combinations should be groups;

a distance computation procedure that computes a distance between coordinates of antennas projected on said plane in parallel with said direction vector and decides that a shortest distance of the computed results of the distance between coordinates of antennas that make up each of said groups should be a group shortest distance;

an identification procedure that identifies a group in which said group shortest distance is the longest; and a communication procedure that has a plurality of communication sections with which the radio communication is provided performs communication with said radio station using a plurality of antennas that make up the group identified by said identification procedure.

According to the present invention, if the number of antennas that can be used for radio communication devices that are provided with a plurality of antennas is restricted, an adequate combination of antennas can be easily selected.

EXEMPLARY EMBODIMENTS

First Embodiment

Next, a radio communication device (including a radio communication method and a program) according to first embodiment of the present invention will be described.

First, with reference to FIG. 1, the structure of radio communication device 1 according to first embodiment will be described.

Figure 1:
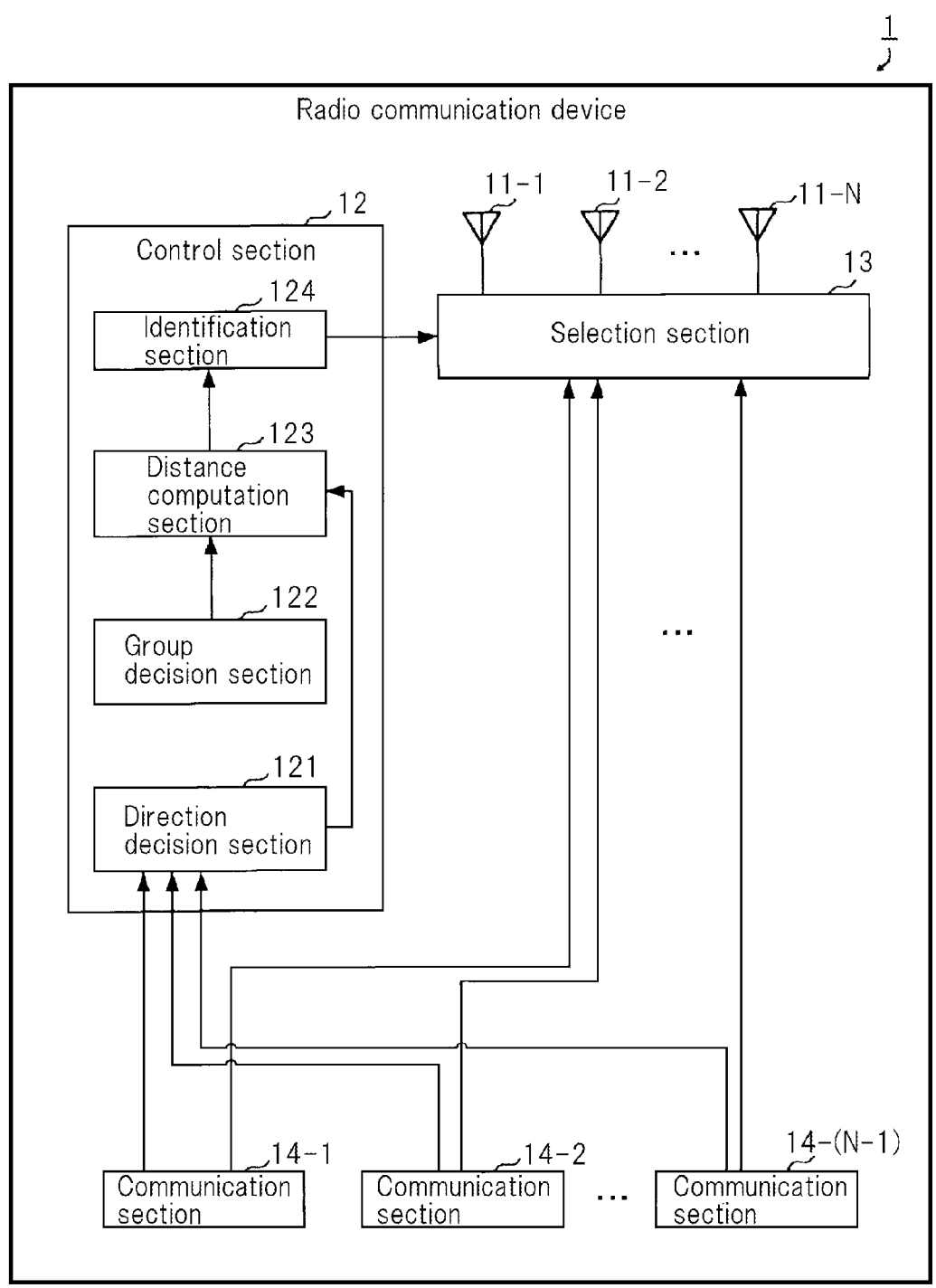
FIG. 1 is a schematic diagram showing the structure of a radio communication device according to first embodiment of the present invention.

As shown in FIG. 1, radio communication device 1 according to first embodiment is provided with N (where N is any integer equal to or greater than 3) antennas 11-1 to 11-N, control section 12, selection section 13, and (N−1) communication sections 14-1 to 14-(N−1).

Control section 12 is provided with direction decision section 121, group decision section 122, distance computation section 123, and identification section 124.

In this embodiment, although the case in which the number of communication sections is "N−1" will be exemplified, the number of communication sections may be any number as long as it is equal to or larger than 2 and less than N. However, although radio communication device 1 may be provided with N or more communication sections, the number of communication sections used for communication is smaller than the number of antennas. For example, if N communication sections and N antennas are provided and if one of communication sections is not used for energy saving of radio communication device 1, the present invention can be applied.

Radio communication device 1 identifies L ($2 \leq L \leq N-1$) antennas from N antennas 11-1 to 11-N and transmits and receives radio signals to and from radio station 2 using the L antennas. The number of radio stations 2 may be any number. Radio station 2 may be either a terminal station or a base station.

In the following, the case in which the number of antennas, L, identified by radio communication device 1 is equal to the number of communication sections 14-1 to 14-(N−1), (N−1), will be described. Moreover, in the following, the i-th (where $1 \leq i \leq N$) antenna of antennas 11-1 to 11-N is denoted by antenna 11-$i$.

Control section 12 identifies L antennas from antennas 11-1 to 11-N based on signals received from radio station 2 using antennas 11-1 to 11-N and output from communication sections 14-1 to 14-(N−1) and notifies selection section 13 of the identified L antennas.

Direction decision section 121 decides a "direction vector $D_{DOA}$" that represents the direction from radio communication device 1 to radio station 2 based on the signals that are output from communication sections 14-1 to 14-(N−1).

There are a variety of methods that decide a direction vector $D_{DOA}$.

For example, direction decision section 121 obtains the relevant position of radio station 2 to the position of radio communication device 1 and decides a direction vector $D_{DOA}$ based on the relative position of radio station 2.

In this method, direction decision section 121 obtains position information from radio station 2 and decides that the position represented by the position information obtained from radio station 2 corresponding to the position (for example, longitude, latitude, and elevation) of radio communication device 1 measured by the GPS (Global Positioning System) should be the relative position of radio station 2.

As another method, direction decision section 121 computes the direction from which radio signals arrive based on the radio signals that are received by antennas 11-1 to 11-N and decides that the vector that represents this direction should be the direction vector $D_{DOA}$.

In this method, radio signals are successively received on a time-division basis using antennas 11-1 to 11-N and then direction decision section 121 computes the direction from which radio signals arrive based on N radio signals that are received using antennas 11-1 to 11-N.

Alternatively, all combinations of L antennas are extracted from N antennas, radio signals are received using L antennas of each combination, and then direction decision section 121 may compute the direction from which the radio signals arrive based on those received using each combination of the antennas.

According to this embodiment, the case in which a direction vector $D_{DOA}$ is decided based on the relative position of radio station 2 will be exemplified.

In this case, communication sections 14-1 to 14-(N−1) transmit a transmission request signal that requests radio station 2 to transmit position information using connected antennas and receive the position information of radio station 2 transmitted as radio signals corresponding to the transmission request signal.

Thereafter, direction decision section 121 obtains the position information received as radio signals by communication sections 14-1 to 14-(N−1) and decides the direction vector $D_{DOA}$ based on the position represented by the position information of radio station 2 obtained from radio station 2 corresponding to the position of radio communication device 1 as the relative position of radio station 2.

Figure 2:
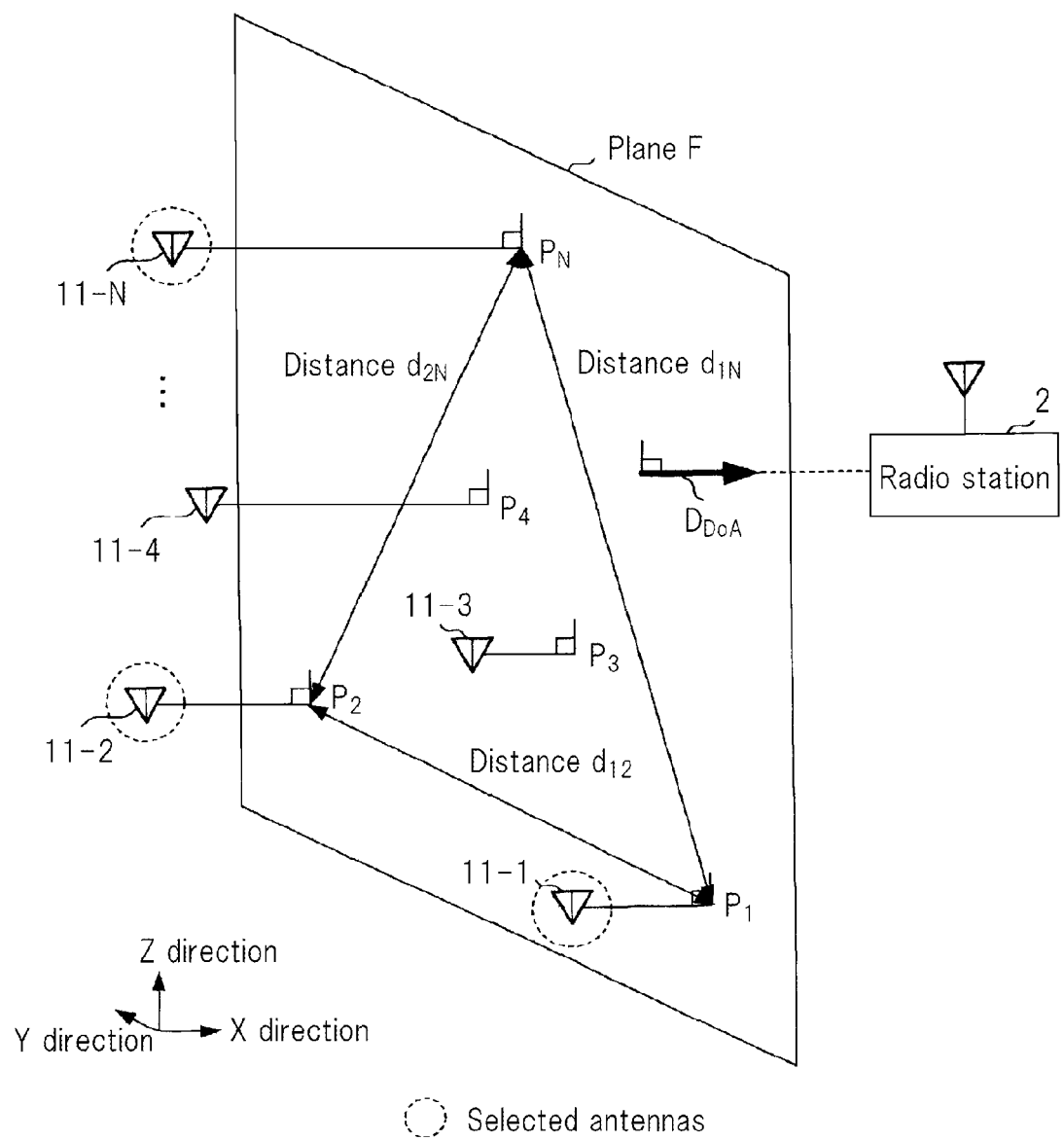
FIG. 2 is a schematic diagram showing coordinates of antennas projected to a plane on which a direction vector becomes a perpendicular line in parallel with the direction vector.

In the following, as shown in FIG. 2, the case in which antennas 11-1 to 11-N and radio station 2 are three-dimensionally arranged will be exemplified. The direction vector $D_{DOA}$ in the xyz space shown in FIG. 2 can be expressed by the following equation (1).

$$D_{DOA} = \begin{pmatrix} x_u \\ y_u \\ z_u \end{pmatrix} \quad \text{Equation (1)}$$

Thereafter, direction decision section 121 computes a plane F on which the direction vector $D_{DOA}$ becomes a perpendicular line. The plane F can be expressed by the following equation (2).

$$x_u \cdot x + y_u \cdot y + z_u \cdot z = E \quad \text{Equation (2)}$$

In equation (2), E is any constant.

Thereafter, direction decision section 121 notifies distance computation section 123 of the direction vector $D_{DOA}$ and plane F.

Group decision section 122 extracts all combinations of L antennas from N antennas, decides that the individual combinations should be individual groups, and notifies distance computation section 123 of the groups. In this case, group decision section 122 notifies distance computation section 123 of groups whose number is equal to the number of groups, $NUM_{GRP}$, expressed by the following equation (3).

$$NUM_{GRP} = {}_NC_L = \frac{N!}{(N-L)! \cdot L!} \quad \text{Equation (3)}$$

Distance computation section 123 computes the distance $d_{ij}$ between two points on plane F to which two antennas extracted from L antennas are projected in parallel with the direction vector $D_{DOA}$ as each group that is notified by group decision section 122. Likewise, distance computation section 123 computes the distance between two points on plane F to which two antennas of each of all combinations extracted from L antennas that make up each group are projected in parallel with the direction vector $D_{DOA}$. In other words, distance computation section 123 computes distances $d_{ij}$ whose number is equal to the number of antenna pairs, $NUM_{ATN}$, expressed by the following equation (4).

$$NUM_{ATN} = {}_LC_2 = \frac{N!}{(L-2)! \cdot 2!} \quad \text{Equation (4)}$$

In the following, a specific method that computes the distances $d_{ij}$ will be described.

First, distance computation section 123 computes coordinates $(x_i, y_i, z_i)$ of antenna 11-$i$ ejected on plane F that is notified by direction decision section 121 in parallel with the direction vector $D_{DOA}$ notified by direction decision section 121.

A point $P_i$ on plane F at the coordinates $(x_i, y_i, z_i)$ is a point of intersection between a straight line expressed by the following equation (5) and plane F.

$$\frac{x - x_i}{x_u} = \frac{y - y_i}{y_u} = \frac{z - z_i}{z_u} \quad \text{Equation (5)}$$

Thereafter, distance computation section 123 computes the distance $d_{ij}$ between point $P_i$ to which i-th antenna 11-$i$ is projected and $P_j$ to which j-th antenna 11-$j$ is projected.

Thereafter, distance computation section 123 decides that the shortest distance of the distances $d_{ij}$ computed for all combinations of two antennas extracted from L antennas that make up each group notified by group decision section 122 should be the group shortest distance $D_{min}$ of each group.

Thereafter, distance computation section 123 outputs the group shortest distance $D_{min}$ of each group notified by group decision section 122 to identification section 124.

Identification section 124 compares the group shortest distances $D_{min}$ of individual groups that are output from distance computation section 123 and identifies a group in which the group shortest distance $D_{min}$ is the longest from among all the groups. Thereafter, identification section 124 notifies selection section 13 of L antennas that make up the identified group.

If three antennas are selected from N antennas 11-1 to 11-N in the example shown in FIG. 2, identification section 124 identifies a group that is made up of antennas 11-1, 11-2, and 11-N in which the group shortest distance $D_{min}$ is the longest.

Figure 3:
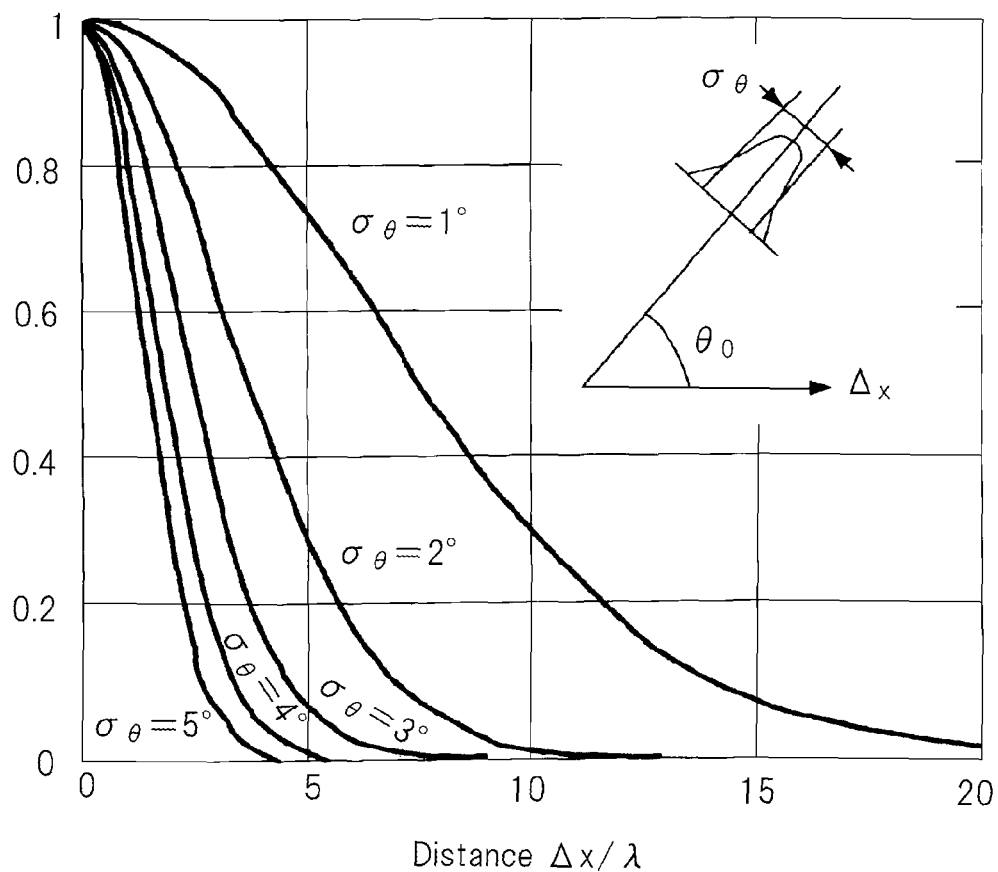
FIG. 3 is a diagram showing a first example of characteristics of distances between antennas and correlation coefficients of radio signals.
Figure 4:
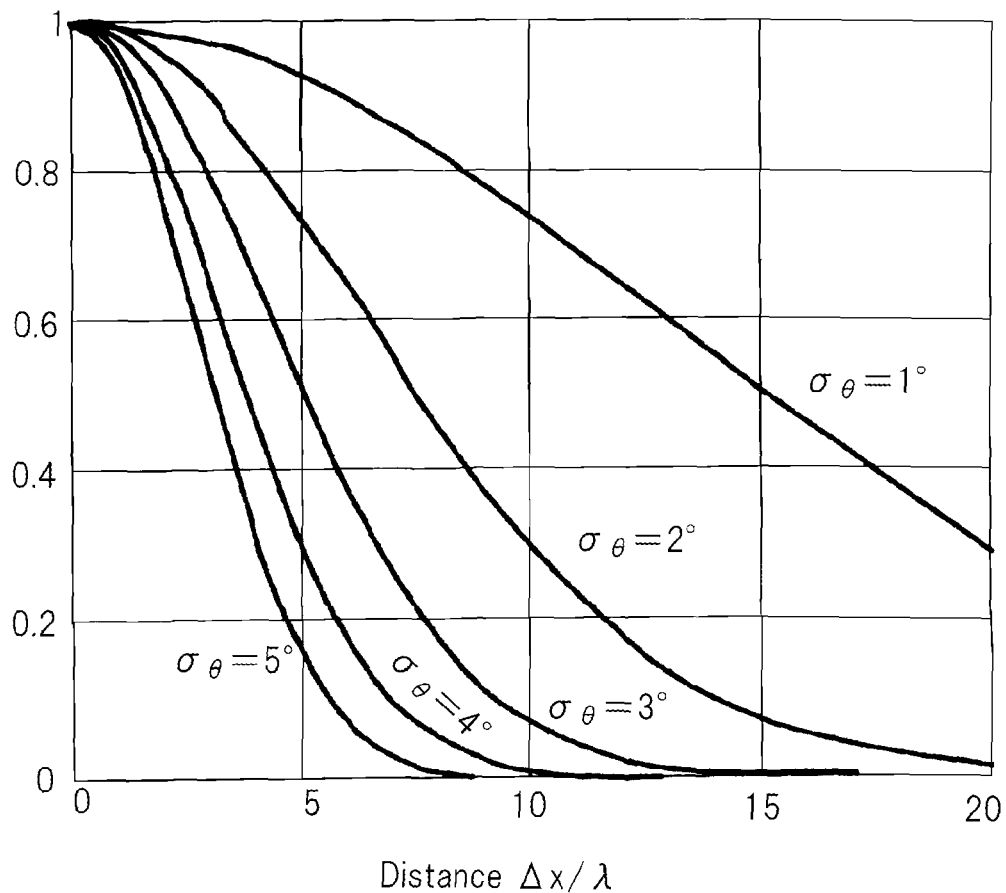
FIG. 4 is a diagram showing a second example of characteristics of distances between antennas and correlation coefficients of radio signals.

Document A (Yoshio Karasawa, "Basics on Radio wave Propagation in Digital Mobile Communications (translated title)," Corona-Sha, (2003) p. 67) discloses that as the distance between two antennas becomes large, the correlation coefficient $\rho_p$ between radio signals transmitted and received by individual antennas becomes small as shown in FIG. 3 and FIG. 4.

In other words, identification section 124 identifies L antennas from N antennas 11-1 to 11-N such that the correlation value between radio signals transmitted from radio station 2 in the direction represented by the direction vector $D_{DOA}$ becomes the minimum.

Referring to FIG. 1 again, selection section 13 selects L antennas from N antennas such that the L antennas make up a group notified by identification section 124.

In this context, "select" means an operation of selection section 13 that connects L antennas notified by identification section 124 and L communication sections of communication sections 14-1 to 14-(N−1) in a one-to-one relationship.

In this descriptive example, since the number of antennas, L, identified by identification section 124 is equal to the number of communication sections 14-1 to 14-(N−1), N−1, the L antennas notified by identification section 124 and communication sections 14-1 to 14-(N−1) are connected in a one-to-one relationship.

If selection section 13 has connected antenna 11-$i$ and any one of communication sections 14-1 to 14-(N−1), a radio signal received from radio station 2 using antenna 11-$i$ is output to the communication section connected to antenna 11-$i$.

Communication sections 14-1 to 14-(N−1) each are made up of a transmission unit and a reception unit.

L communication sections of communication sections 14-1 to 14-(N−1) transmit radio signals to radio station 2 using the L antennas selected by selection section 13.

In addition, the L communication sections of communication sections 14-1 to 14-(N−1) receive radio signals transmitted from radio station 2 using L antennas selected by selection section 13.

In addition, according to this embodiment, communication sections 14-1 to 14-(N−1) receive position information of radio station 2 transmitted from radio station 2 as radio signals and output the position information to direction decision section 121.

Individual communication sections 14-1 to 14-(N−1) may have been connected to a plurality of terminals (not shown) used by a plurality of users.

Next, with reference to FIG. 5, an operation of radio communication device 1 that has the foregoing structure selects L antennas from N antennas 11-1 to 11-N and that performs communication using the selected L antennas will be described.

Figure 5:
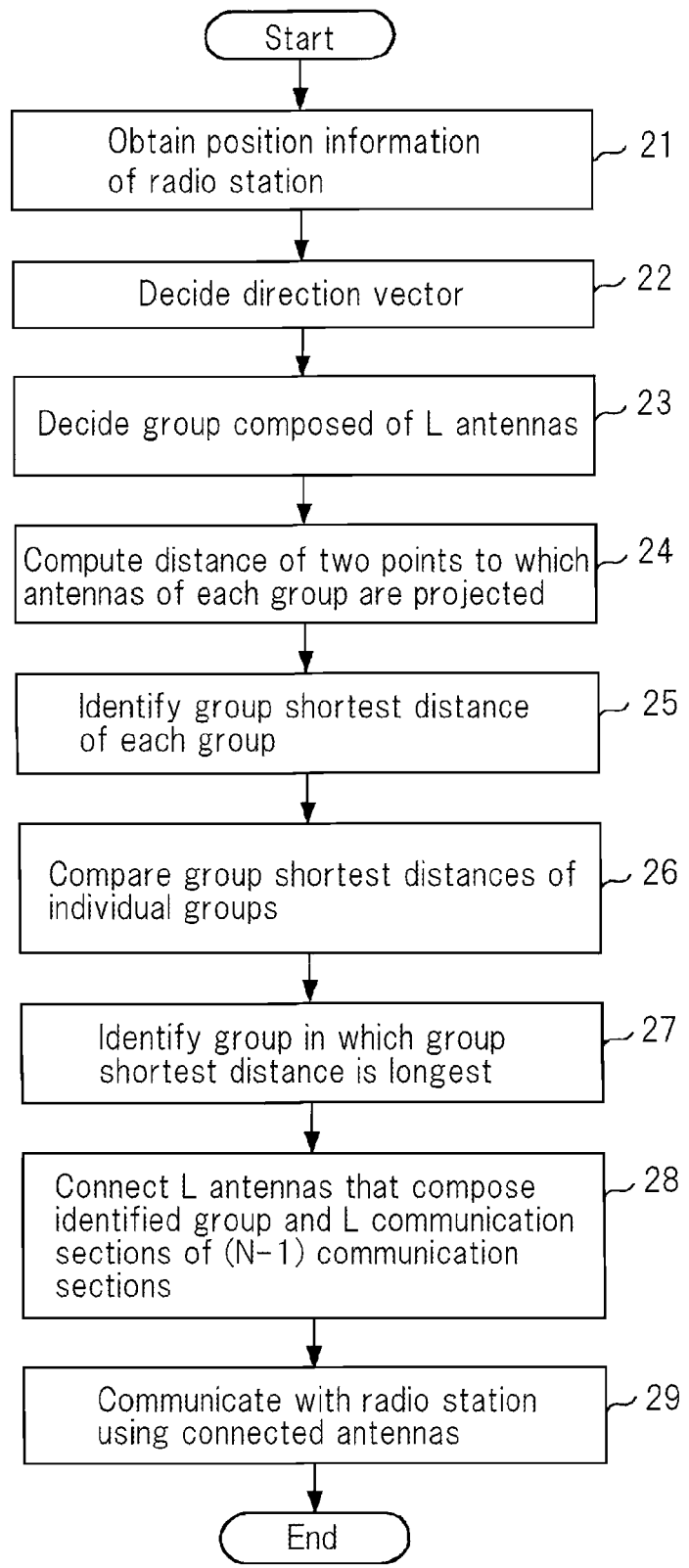
FIG. 5 is a flow chart showing an operation that selects L antennas from N antennas and performs communication using the selected antennas.

At step 21 shown in FIG. 5, communication sections 14-1 to 14-(N−1) output position information of radio station 2 received from radio station 2 using connected antennas 11-1 to 11-N to direction decision section 121.

Thereafter, at step 22, direction decision section 121 decides a direction vector $D_{DOA}$ that represents the direction from radio communication device 1 to radio station 2 based on the position information of radio station 2 and the position information of radio communication device 1 and notifies distance computation section 123 of the decided direction vector $D_{DOA}$.

Thereafter, direction decision section 121 computes a plane F on which the direction vector $D_{DOA}$ becomes a perpendicular line and notifies distance computation section 123 of plane F.

Thereafter, at step 23, group decision section 122 extracts all combinations of L antennas from N antennas and decides that they should be individual groups. Thereafter, group decision section 122 notifies distance computation section 123 of the decided groups.

Thereafter, at step 24, distance computation section 123 computes the distance $d_{ij}$ between two points on plane F to which two antennas of each of combinations extracted from L antennas that make up each group that is notified by group decision section 122 are projected in parallel with the direction vector $D_{DOA}$.

Thereafter, at step 25, distance computation section 123 decides that the shortest distance of the distances $d_{ij}$ computed for all combinations of two antennas extracted from L antennas that make up each group should be the group shortest distance $D_{min}$ of the group and outputs it to identification section 124.

Thereafter, at step 26, identification section 124 compares the group shortest distances $D_{min}$ of the individual groups that are output from distance computation section 123.

Thereafter, at step 27, identification section 124 identifies a group in which the group shortest distance $D_{min}$ is the longest and notifies selection section 13 of L antennas that belong to the group.

Thereafter, at step 28, selection section 13 connects the L antennas notified by identification section 124 and the L communication sections of communication sections 14-1 to 14-(N−1) in the one-to-one relationship.

In this descriptive example, since the number of antennas, L, is equal to the number of communication sections 14-1 to 14-(N−1), N−1, selection section 13 connects (N−1) antennas notified by identification section 124 and communication sections 14-1 to 14-(N−1) in the one-to-one relationship.

Thereafter, at step 29, communication sections 14-1 to 14-(N−1) each transmit and receive radio signals to and from radio station 2 using the antennas respectively connected by selection section 13.

Now, a sequence of operations of radio communication device 1 that selects L antennas from N antennas and that performs communication using the selected antennas will have been completed.

If selection section 13 selects 2 (L=2) antennas from N antennas, the number of antenna pairs, $NUM_{ATN}$, expressed by equation (4) becomes "1." Thus, since the distance between two antennas that make up each group becomes the same as the group shortest distance $D_{min}$, identification section 124 identifies a group that is made up of two antennas in which the distance between two points projected on plane F is the largest from N antennas.

As described above, according to the first embodiment of the present invention, radio communication device 1 identifies L antennas in which the group shortest distance $D_{min}$ is the longest from antennas 11-1 to 11-N based on the geometric arrangement of radio communication device 1, radio station 2, and antennas 11-1 to 11-N.

Thus, L antennas in which the correlation value between radio signals transmitted to and received from radio station 2 becomes the smallest can be identified by a very small amount of geometric computation. As a result, if the number of antennas that can be used in a radio communication device having N antennas is restricted, an appropriate combination of antennas can be easily selected.

Second Embodiment

Next, a radio communication device according to second embodiment will be described.

Figure 6:
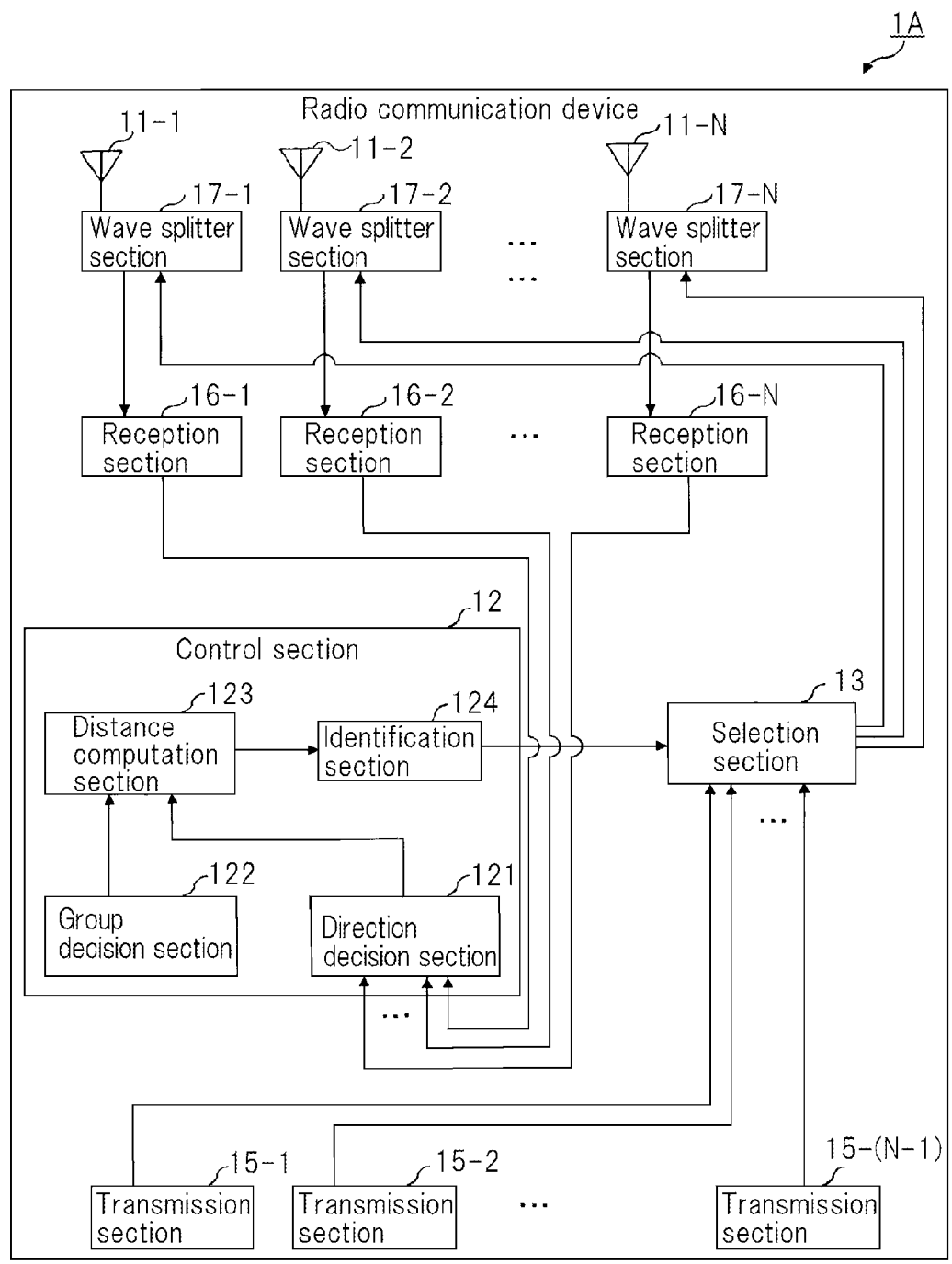
FIG. 6 is a schematic diagram showing the structure of a radio communication device according to second embodiment.

Radio communication device 1A according to second embodiment is different from radio communication device 1 shown in FIG. 1 in that the former is not provided with communication sections 14-1 to 14-(N−1), but is provided with transmission sections 15-1 to 15-(N−1), reception sections 16-1 to 16-N, and wave splitter sections 17-1 to 17-N shown in FIG. 6.

Transmission sections 15-1 to 15-(N−1) are transmission units.

L transmission sections of transmission sections 15-1 to 15-(N−1) transmit radio signals to radio station 2 using L antennas selected by selection section 13.

In this embodiment, although the case in which the number of transmission sections is "N−1" will be exemplified, the number of transmission sections is not limited thereto as long as it is any integer that is equal to or greater than 2 and less than N. Moreover, in the following, the case in which the number of antennas, L, identified by identification section 124 is equal to the number of transmission sections 15-1 to 15-(N−1), N−1, will be exemplified.

Reception sections 16-1 to 16-N are reception units provided corresponding to N antennas 11-1 to 11-N in a one-to-one relationship.

Reception sections 16-1 to 16-N receive radio signals that are transmitted from radio station 2 using all antennas 11-1 to 11-N with which radio communication device 1A is provided.

Moreover, reception sections 16-1 to 16-N outputs position information of radio station 2 received from radio station 2 using antennas 11-1 to 11-N to direction decision section 121.

Radio communication device 1A according to second embodiment is provided with N reception sections 16-1 to 16-N whose number is larger than the number of communication sections 14-1 to 14-(N−1) with which radio communication device 1 according to first embodiment is provided. Thus, radio communication device 1A has a more excellent reception performance than radio communication device 1 does.

Wave splitter sections 17-1 to 17-N are provided corresponding to antennas 11-1 to 11-N in a one-to-one relationship. Wave splitter sections 17-1 to 17-N are, for example, duplexers.

Wave splitter sections 17-1 to 17-N each have a function that separates transmission paths of radio signals that are output from L transmission sections of transmission sections 15-1 to 15-(N−1) and transmitted using L antennas and transmission paths of radio signals that are received using antennas 11-1 to 11-N and that are output to reception sections 16-1 to 16-N.

Moreover, in this embodiment, identification section 124 identifies a group in which the group minimum distance $D_{min}$ is the longest from among all the groups and notifies selection section 13 of L antennas that belong to the identified group.

Thereafter, selection section 13 selects the antennas notified by identification section 124. In other words, selection section 13 connects the L antennas notified by identification section 124 and L transmission sections of transmission sections 15-1 to 15-(N−1) in the one-to-one relationship.

In this descriptive example, since the number of antennas, L, identified by identification section 124 is equal to the number of transmission sections 15-1 to 15-(N−1), N−1, the L antennas notified by identification section 124 and transmission sections 15-1 to 15-(N−1) are connected in the one-to-one relationship.

Thereafter, transmission sections 15-1 to 15-(N−1) each transmit radio signals to radio station 2 using the L antennas connected by selection section 13.

In contrast, reception sections 16-1 to 16-N receive radio signals transmitted from radio station 2 using all the N antennas with which radio communication device 1A is provided.

As described above, according to second embodiment, L antennas in which the correlation value of radio signals transmitted to and received from radio station 2 becomes the smallest can be identified by a very small amount of a geometric computation. Thus, if the number of antennas that can be used in a radio communication device that is provided with N antennas is limited, an appropriate combination of antennas can be easily selected.

In addition, according to second embodiment, radio communication device 1A is provided with N reception sections 16-1 to 16-N whose number is larger than the number of communication sections 14-1 to 14-(N−1) with which radio communication device 1 shown in FIG. 1 is provided. Thus, when radio communication device 1A decides a direction vector $D_{DOA}$ based on radio signals received from radio station 2 using antennas 11-1 to 11-N, since it is not necessary to receive radio signals on a time-division basis unlike first embodiment, radio communication device 1A can receive the radio signals in a shorter time than first embodiment.

It should be noted that a variety of modifications can be formed without departing from the spirit of the present invention.

If communication sections 14-1 to 14-(N−1) of radio communication device 1 are connected to a plurality of terminals (not shown) and radio communication device 1 can communicate with a plurality of radio stations 2 located in different directions, a plurality of terminals (not shown) communicate with different radio stations 2. In this case, since the direction vectors $D_{DOA}$ of radio stations 2 with which individual terminals communicate differ from each other, groups of L antennas that the individual terminal use to communicate with radio station 2 through radio communication device 1 differ from each other.

Thus, antennas that make up individual groups decided by group decision section 122 need to be used for individual terminals that communicate with individual radio stations 2.

To accomplish such an operation, identification section 124 pre-stores group change information.

Figures 7, 8:
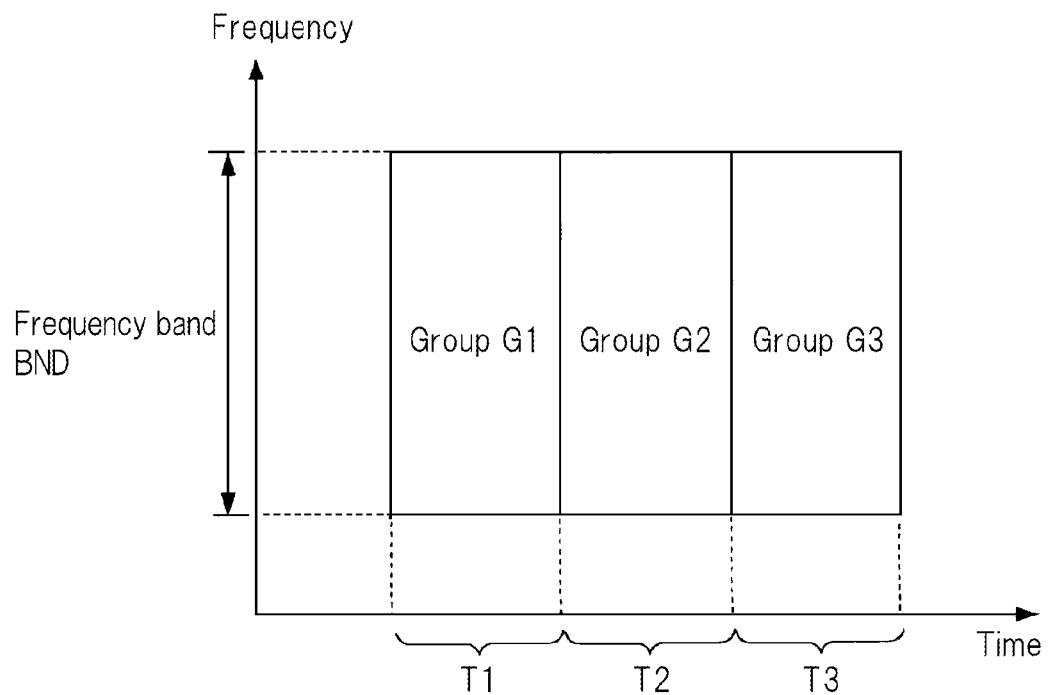
FIG. 7 is a schematic diagram showing an example of the data structure of group change information.
FIG. 8 is a schematic diagram showing an example of an operation of an identification section that identifies different groups as a predetermined time elapses.

As shown in FIG. 7, the group change information is information that correlates a plurality of groups decided by group decision section 122, antennas that make up each group, and terminals that communicate with radio station 2 using the antennas that make upcompose each group.

Thereafter, as shown in FIG. 8, identification section 124 successively identifies groups that transmit and receive radio signals with the same frequency band BND for every predetermined time from the group change information shown in FIG. 7 and notifies selection section 13 of the identified groups. In the example shown in FIG. 8, identification section 124 identifies group G1 stored in the group change information at predetermined time T1 and notifies selection section 13 of group G1, identifies group G2 from the group change information at predetermined time T2 and notifies selection section 13 of group G2, and identifies group G3 from the group change information at predetermined time T3 and notifies selection section 13 of group G3.

As a result, whenever selection section 13 is notified of a group by identification section 124, selection section 13 selects L antennas that make up the group.

Thus, a plurality of terminals that a plurality of user respectively use can commonly use antennas 11-1 to 11-N and communication sections 14-1 to 14-(N−1) with which radio communication device 1 is provided.

In addition, if a plurality of direction vectors $D_{DOA}$ decided by direction decision section 121 at different timings represent the same direction, groups identified by identification section 124 at individual timings become the same.

In this case, direction decision section 121 computes a plane F on which a predetermined direction (for example, a direction such as east, west, south, or north) based on radio communication device 1 becomes a perpendicular line and notifies distance computation section 123 of plane F.

Distance computation section 123 computes the distance $d_{ij}$ between two points on plane F to which two antennas of each of all combinations extracted from L antennas that make up each group are projected in parallel with the predetermined direction. Thereafter, distance computation section 123 decides that the shortest distance of the distances $d_{ij}$ computed for all combinations of two antennas extracted from L antennas that make up each group should be the group shortest distance $D_{min}$. Thereafter, distance computation section 123 outputs the group shortest distance $D_{min}$ of each group to identification section 124.

Figures 9, 10:
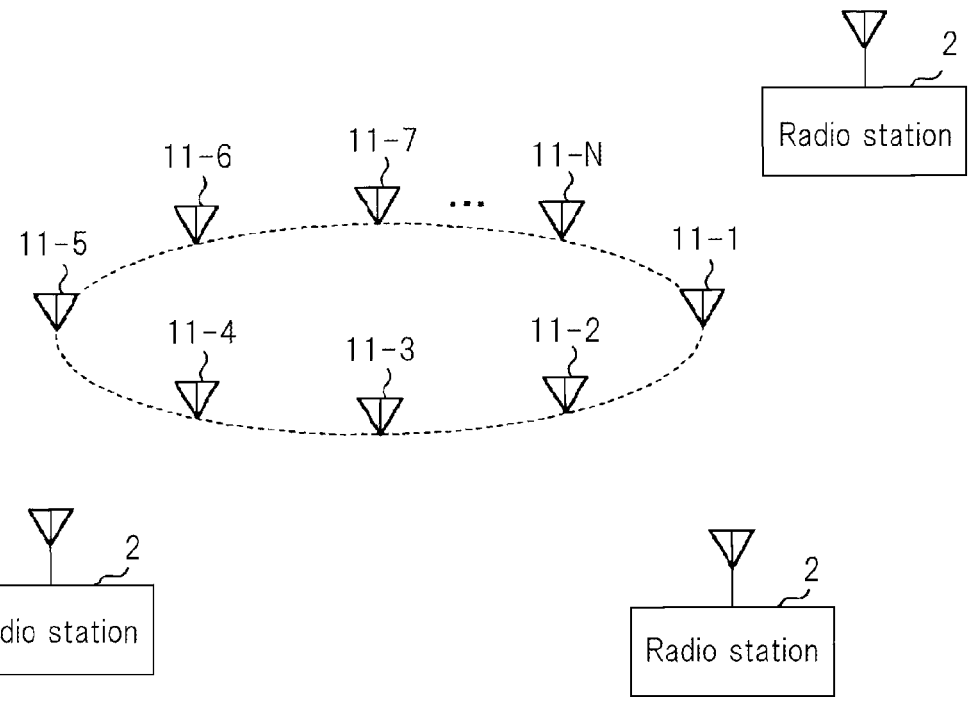
FIG. 9 is a schematic diagram showing an example of the data structure of antenna identification information.
FIG. 10 is a schematic diagram showing an example in which N antennas are arranged in a circular shape.

Identification section 124 compares the group shortest distances $D_{min}$ of the individual groups and identifies a group in which the group shortest distance $D_{min}$ is the longest. Thereafter, identification section 124 stores information that correlates the identified group and the predetermined direction as antenna identification information shown in FIG. 9. Direction decision section 121, distance computation section 123, and identification section 124 continuously execute the foregoing operation for any predetermined direction.

Identification section 124 performs such an operation so as to correlatively store predetermined directions based on radio communication device 1 and combinations of L antennas in which the correlation value of radio signals transmitted to and received from each predetermined direction becomes the minimum.

When direction decision section 121 decides a direction vector $D_{DOA}$ based on signals received from radio station 2 using antennas 11-1 to 11-N, identification section 124 identifies L antennas that are stored such that they are correlated with the predetermined direction that is the same as the direction vector $D_{DOA}$ and notifies selection section 13 of the identified antennas.

As a result, whenever direction decision section 121 decides a direction vector $D_{DOA}$, since direction decision section 121 and distance computation section 123 do not need to compute a plane F and a group shortest distance $D_{min}$, respectively, the amount of computation for radio communication device 1 can be decreased.

Alternatively, if omnidirectional antennas that transmit radio signals in all directions with the same signal strength are used as antennas 11-1 to 11-N and if they are arranged in a circular shape on the same plane, the group shortest distance $D_{min}$ becomes constant in all directions. Thus, since the correlation value of radio signals transmitted to and received from radio station 2 using L antennas located in any direction can be further decreased, the communication quality and amount of data that can be transmitted and received can be prevented from deteriorating and becoming lower, respectively, in MIMO.

Alternatively, group decision section 122 shown in FIG. 1 may change the number of antennas that make up each group based on the data amount of radio signals that communication sections 14-1 to 14-(N−1) transmit and receive to and from radio station 2.

Thus, if the data amount is small, the number of transmission units or reception units to which power is supplied can be decreased and thereby power consumption of radio communication device 1 can be reduced.

Alternatively, group decision section 122 shown in FIG. 1 may change the number of antennas that make up each group based on the type or quality or type and quality of communication performed by communication sections 14-1 to 14-(N−1) perform.

Thus, the number of communication sections 14-1 to 14-(N−1) to which power is supplied can be decreased corresponding to QoS (Quality of Service) that ensures a predetermined communication band that assures communication speeds of radio signals transmitted to and received from communication sections 14-1 to 14-(N−1) and thereby power consumption of radio communication device 1 can be reduced.

In addition, radio communication device 1A can be provided in an FDD (Frequency Division Duplex) system that performs full duplex communication in which different frequency bands are allocated to radio transmission signals and radio reception signals.

In this case, a transmission filter that has a pass band as a transmission frequency band and a stop band as a reception frequency band and a reception filter that has a pass band as the reception frequency band and a stop band as the transmission frequency band can be used as wave splitter sections 17-1 to 17-N shown in FIG. 6.

Alternatively, radio communication device 1A may be provided in a TDD (Time Division Duplex) system that is a full duplex communication system that alternately transmits or receives a radio signal in a common frequency band for every predetermined period.

In this case, a switch that connects one particular antenna of those that make up a group identified by identification section 124 and one of transmission sections 15-1 to 15-(N−1) in a transmission period for a radio signal and that connects the particular antenna and one of reception sections 16-1 to 16-N in a reception period for a radio signal may be used as wave splitter sections 17-1 to 17-N.

Figure 11:
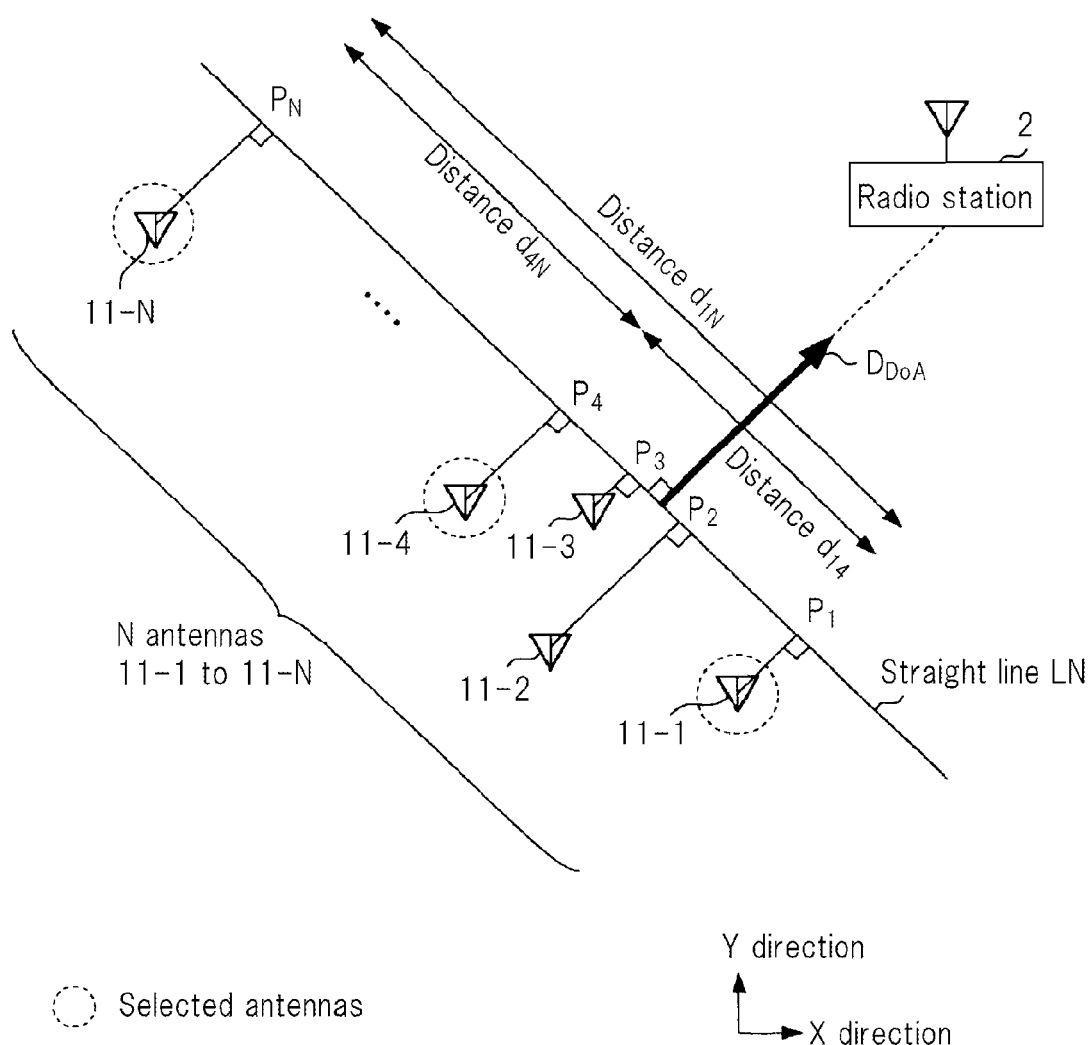
FIG. 11 is a schematic diagram showing coordinates of antennas projected to a straight line on which a direction vector becomes a perpendicular line in parallel with the direction vector.

Alternatively, as shown in FIG. 11, the radio communication device according to the present invention can identify L antennas in which the correlation value becomes the minimum even if both N antennas 11-1 to 11-N and radio station 2 are located on the same xy plane.

A direction vector $D_{DOA}$ on the xy plane shown in FIG. 11 can be expressed by the following equation (6).

$$D_{DOA} = \begin{pmatrix} x_u \\ y_u \end{pmatrix}$$ Equation (6)

In addition, a straight line LN on which the direction vector $D_{DOA}$ becomes a perpendicular line on the xy plane is computed. The straight line LN can be expressed by the following equation (7).

$$\frac{x}{y_u} + \frac{y}{x_u} = E1$$ Equation (7)

In equation (7), E1 is any constant. In this example, direction decision section 121 notifies distance computation section 123 of direction vector $D_{DOA}$ and straight line LN.

Thereafter, distance computation section 123 computes distance $d_{ij}$ between two points on straight line LN to which two antennas of each of all combinations of L antennas that make up each group notified by group decision section 122 are projected in parallel with direction vector $D_{DOA}$.

Next, a specific computation method for distance $d_{ij}$ will be described.

First, distance computation section 123 computes coordinates $(x_i, y_i)$ of antenna 11-i projected on straight line LN notified by direction decision section 121 in parallel with direction vector $D_{DOA}$ notified by direction decision section 121. A point $P_i$ on straight line LN at coordinates $(x_i, y_i)$ is a point of intersection of a straight line expressed by the following equation (8) and straight line LN.

$$\frac{x - x_i}{x_u} = \frac{y - y_i}{y_u}$$ equation (8)

Thereafter, distance computation section 123 computes the distance $d_{ij}$ between point $P_i$ to which i-th antenna 11-i is projected and point $P_j$ to which j-th antenna 11-j is projected. Thereafter, distance computation section 123 decides that the shortest distance of distances $d_{ij}$ computed for all combinations of two antennas extracted from L antennas that make up each group should be group shortest distance $D_{min}$ of each group. Thereafter, distance computation section 123 outputs group shortest distance $D_{min}$ of each group notified by group decision section 122 to identification section 124.

If three antennas are selected from N antennas 11-1 to 11-N in the example shown in FIG. 11, identification section 124 identifies a group that is made up of antennas 11-1, 11-4, and 11-N in which group shortest distance $D_{min}$ is the longest.

Alternatively, according to the present invention, the process by which radio communication device 1 communicates is not limited to foregoing hardware; instead, the communication process may be accomplished in such a manner that a program that causes the function to be accomplished is recorded on a record medium and the program recorded on the record medium is read by a computer and executed thereby. The recording medium that can be read by the computer that operates as radio communication device 1 is for example a movable recording medium such as a floppy disk (registered trademark), a magneto-optical disc, a DVD, or a CD or a HDD built in the computer. The program recorded on the recording medium is read by a processor with which the computer operates as radio communication device 1 is provided and that operates as control section 12 has and the processor performs the same process as the foregoing process.

The processor that operates as control section 12 executes a program that is read from the recording medium.

Now, with reference to the embodiments, the present invention has been described. However, it should be understood by those skilled in the art that the structure and details of the present invention may be changed in various manners without departing from the spirit of the present invention.

The present application claims a priority based on Japanese Patent Application JP 2009-202512 filed on Sep. 2, 2009, the entire contents of which are incorporated herein by reference in its entirety.

The invention claimed is:

1. A radio communication device having a plurality of antennas that is capable of transmitting and receiving radio signals to and from a radio station, the radio communication device comprising:
   a direction decision section that decides a direction vector that represents a direction from the radio communication device to said radio station based on the radio signals that are received from said radio station by said plurality of antennas and computes a plane on which the direction vector becomes a perpendicular line;
   a group decision section that extracts combinations of antennas of the plurality of antennas having a group number smaller than a number of said plurality of antennas and decides that the combinations are groups;
   a distance computation section that computes a distance between coordinates of the antennas that make up each of said groups projected on said plane in parallel with said direction vector and decides that a shortest distance of computed results of the distance between the coordinates of the antennas that make up each of said groups should be a group shortest distance;
   an identification section that identifies a group of the plurality of antennas in which said group shortest distance is the longest; and
   a plurality of communication sections that perform communication with said radio station using the plurality of antennas that make up the group identified by said identification section.

2. The radio communication device according to claim 1, wherein said direction decision section computes a plane on which a predetermined direction based on the radio communication device becomes a perpendicular line,
   wherein said distance computation section computes the distance between coordinates of antennas projected to a plane on which said predetermined direction becomes a perpendicular line in parallel with the predetermined direction and decides that the shortest distance of the computed results of the distance between coordinates of antennas that make up each of the groups should be a group shortest distance of each group, and
   wherein said identification section identifies a group in which said group shortest distance is the longest, stores the identified group such that it is correlated with said predetermined direction, and identifies a group correlated with said predetermined direction that is the same as that of said direction vector if said direction decision section decides the direction vector.

3. The radio communication device according to claim 1, wherein said communication sections obtain position information that represents the position of said radio station as said radio signals from said radio station, and
   wherein said direction decision section decides said direction vector based on both the position information of said radio station obtained by said communication sections and the position information of the radio communication device.

4. The radio communication device according to claim 1, wherein said direction decision section computes a direction from which the radio signals arrive based on the radio signals received by said plurality of antennas and decides that a vector that represents the computed direction should be said direction vector.

5. The radio communication device according to claim 1, wherein said group decision section changes the group number of antennas that make up said group depending on a data amount of said radio signals transmitted and received by said communication sections.

6. The radio communication device according to claim 1, wherein said group decision section changes the group number of antennas that make up said group based on one or more of a type and a quality of communication performed by said communication sections.

7. A radio communication method for a radio communication device having a plurality of antennas that is capable of transmitting and receiving radio signals to and from a radio station, the radio communication method comprising:
   deciding a direction vector that represents a direction from the radio communication device to said radio station based on the radio signals that are received from said radio station by said plurality of antennas and computing a plane on which the direction vector becomes a perpendicular line;
   extracting combinations of antennas of the plurality of antennas having a group number smaller than a number of said plurality of antennas and deciding that the combinations are groups;
   computing a distance between coordinates of the antennas that make up each of the groups projected on said plane in parallel with said direction vector and deciding that a shortest distance of computed results of the distance between the coordinates of the antennas that make up each of said groups should be a group shortest distance;
   identifying a group of the plurality of antennas in which said group shortest distance is the longest; and
   performing communication with said radio station, by a plurality of communication sections with which the radio communication device is provided, using the plurality of antennas that make up said identified group.

8. The radio communication method according to claim 7, wherein said direction decision is performed by computing a plane on which a predetermined direction based on the radio communication device becomes a perpendicular line,
   wherein said distance computation is performed by computing the distance between coordinates of antennas projected to a plane on which said predetermined direction becomes a perpendicular line in parallel with the predetermined direction and said distance computation decides that the shortest distance of the computed results of the distance between coordinates of antennas that make up each of the groups should be a group shortest distance of each group, and wherein said identification is performed by identifying a group in which said group shortest distance is the longest, storing the identified group such that it is correlated with said predetermined direction, and identifying a group correlated with said predetermined direction that is the same as that of said direction vector if said direction decision is performed.

9. The radio communication method according to claim 7, wherein said communication sections obtain position information that represents the position of said radio station as said radio signals from said radio station, and wherein said direction decision is performed by deciding said direction vector based on both the position information of said radio station and the position information of the radio communication device.

10. The radio communication method according to claim 7, wherein said direction decision is performed by computing a direction from which the radio signals arrive based on the radio signals received by said plurality of antennas and by deciding that a vector that represents the computed direction should be said direction vector.

11. The radio communication method according to claim 7, wherein said group decision is performed by changing the group number of antennas that make up said group depending on a data amount of said transmitted and received radio signals.

12. The radio communication method according to claim 7, wherein said group decision is performed by changing the group number of antennas that make up said group based on one or more of a type and a quality of communication performed by said communication.

13. The radio communication device according to claim 2, wherein said communication sections obtain position information that represents the position of said radio station as said radio signals from said radio station, and wherein said direction decision section decides said direction vector based on both the position information of said radio station obtained by said communication sections and the position information of the radio communication device.

14. The radio communication device according to claim 2, wherein said direction decision section computes a direction from which the radio signals arrive based on the radio signals received by said plurality of antennas and decides that a vector that represents the computed direction should be said direction vector.

15. The radio communication device according to claim 2, wherein said group decision section changes the group number of antennas that make up said group depending on a data amount of said radio signals transmitted and received by said communication sections.

16. The radio communication device according to claim 3, wherein said group decision section changes the group number of antennas that make up said group depending on a data amount of said radio signals transmitted and received by said communication sections.

17. The radio communication device according to claim 4, wherein said group decision section changes the group number of antennas that make up said group depending on a data amount of said radio signals transmitted and received by said communication sections.

18. The radio communication device according to claim 2, wherein said group decision section changes the group number of antennas that make up said group based on one or more of a type and a quality of communication performed by said communication sections.

19. The radio communication device according to claim 3, wherein said group decision section changes the group number of antennas that make up said group based on one or more of a type and a quality of communication performed by said communication sections.

20. The radio communication device according to claim 4, wherein said group decision section changes the group number of antennas that make up said group based on one or more of a type and a quality of communication performed by said communication sections.

* * * * *

UNITED STATES PATENT AND TRADEMARK OFFICE
CERTIFICATE OF CORRECTION

PATENT NO.       : 8,718,575 B2                                                                                 Page 1 of 1
APPLICATION NO.  : 13/386825
DATED            : May 6, 2014
INVENTOR(S)      : Kosuke Tanabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 184 days.

Signed and Sealed this

Twenty-ninth Day of September, 2015

Michelle K. Lee
*Director of the United States Patent and Trademark Office*